US010815848B2

(12) United States Patent
Nino et al.

(10) Patent No.: US 10,815,848 B2
(45) Date of Patent: Oct. 27, 2020

(54) GAS INLET PIPE FOR EXHAUST GAS COOLER

(71) Applicant: Modine Manufacturing Company, Racine, WI (US)

(72) Inventors: Victor G. Nino, Franklin, WI (US); Saman Beyhaghi, Oak Creek, WI (US); Mitchell S. Crawford, South Milwaukee, WI (US); Viswanath Setty, Franklin, WI (US); Zachary W. Kuecker, Kansasville, WI (US)

(73) Assignee: MODINE MANUFACTURING COMPANY, Racine, WI (US)

( * ) Notice: Subject to any disclaimer, the term of this patent is extended or adjusted under 35 U.S.C. 154(b) by 0 days.

(21) Appl. No.: 16/368,416

(22) Filed: Mar. 28, 2019

(65) Prior Publication Data
US 2020/0309001 A1 Oct. 1, 2020

(51) Int. Cl.
*F01N 3/02* (2006.01)
*F28D 7/10* (2006.01)

(52) U.S. Cl.
CPC ............. *F01N 3/0205* (2013.01); *F28D 7/10* (2013.01)

(58) Field of Classification Search
CPC ...... F01N 3/0205; F02M 25/07; F02M 26/20; F28D 7/16; F28F 9/0265
USPC .......................................................... 60/320
See application file for complete search history.

(56) References Cited

U.S. PATENT DOCUMENTS

| | | | |
|---|---|---|---|
| 9,169,756 B2 | 10/2015 | Bucher et al. | |
| 2013/0340980 A1* | 12/2013 | Dirker | F01N 3/043 165/109.1 |
| 2014/0262590 A1* | 9/2014 | Daborn | F01N 3/035 180/309 |
| 2014/0318511 A1* | 10/2014 | Sekiya | F01N 13/08 123/568.11 |
| 2015/0322898 A1* | 11/2015 | Chesney | F02M 26/25 123/568.12 |
| 2018/0023521 A1 | 1/2018 | Jin | |

FOREIGN PATENT DOCUMENTS

| | | |
|---|---|---|
| JP | 2006118436 B2 | 5/2006 |
| JP | 5866798 B2 | 2/2016 |
| JP | 6228365 B2 | 11/2017 |

* cited by examiner

*Primary Examiner* — Jason D Shanske
(74) *Attorney, Agent, or Firm* — Michael Bergnach

(57) ABSTRACT

A heat exchanger assembly, in particular an exhaust gas cooler, having a gas inlet pipe attached to an inlet diffuser to improve flow distribution of the gas in a case with a heat exchanger core within. The gas inlet pipe configured to disrupt the momentum of flow of the gas due to at least one bend upstream of the inlet diffuser. The gas inlet pipe including at least two intermediate bends which define multiple section of the gas inlet pipe, at least two of the sections redirecting flow of the gas before an outlet of the gas inlet pipe to more evenly distribute the gas at the outlet of the gas inlet pipe upstream of the inlet diffuser.

16 Claims, 6 Drawing Sheets

GAS INLET PIPE FOR EXHAUST GAS COOLER

BACKGROUND

Exhaust gas coolers are heat exchanger assemblies that transfer heat between at least two fluids in heat exchanging contact—a coolant and exhaust gas from an internal combustion engine. The performance and durability of such heat exchanger assemblies depend in part on flow distribution of each of these fluids. When the fluids are more evenly distributed, the performance and durability of the heat exchanger will likely increase. Most, if not all, of the components of an exhaust gas cooler contribute to the flow distribution of at least one of the fluids.

On the gas inlet side of the these coolers, an inlet diffuser is used to spread the gas to openings of gas conduits that extend through a core of the heat exchanger, where the gas and the coolant are in thermal contact. The gas enters the inlet diffuser via a pipe-sized port and can expand laterally as the diffuser volume increases toward the core. At the entry to the core, the outlet end of the diffuser extends around the openings of the gas conduits. The effectiveness of the inlet diffuser as a flow distributer, getting an even amount of gas to each of the gas conduit openings regardless of their lateral location in the core, depends on the shape of the diffuser, but also depends on the fluid distribution effectiveness of other components, such as the gas inlet pipe to the inlet diffuser. Space concerns, such the packaging of the exhaust gas cooler within a vehicle, can influence the diffuser shape and may compromise flow distribution through it. For instance, the diffuser inlet port may not always be located along a center axis of the diffuser that extends through the diffuser outlet end, which will clearly effect the flow distribution within the diffuser. Further, fluid mechanics upstream in the gas inlet piping will effect the flow distribution downstream in the diffuser, as fluid momentum can carry the fluid in a predominant direction. This may result in uneven gas flow to all of the gas conduit openings at the inlet side of the heat exchanger core-one side of the core being unbalanced with the other, for example. The design of the gas inlet pipe can mitigate the risk of such uneven flow in the inlet diffuser and to the gas conduit openings of the core.

SUMMARY

The current invention includes an gas inlet pipe for a heat exchanger assembly to improve the flow distribution of a gas within the inlet pipe and to a heat exchanger core of the heat exchanger assembly to improve the performance the heat exchanger core. The current invention is particularly effective in directing the gas within such a pipe considering the forces acting on the gas, especially a pipe having at least one bend upstream of the heat exchanger, as bends can create forces on the gas; for example, the gas may be forced to one side of the pipe as it traverses the bend. The current invention counters such forces by adding additional bends in the pipe between at least one bend and the heat exchanger core, and in particular, between the at least one bend and an inlet diffuser of the heat exchanger assembly, where the inlet diffuser directs the gas into the core.

In a preferred embodiment, a gas inlet pipe is directly connected to a gas inlet diffuser attached to a gas inlet of an exhaust gas cooler. In particular, an outlet of the gas inlet pipe aligns with an inlet of the gas inlet diffuser, and an outlet of the gas inlet diffuser attaches to a case of the exhaust gas cooler at an inlet opening of the case. In the preferred embodiment, a core of gas tubes is disposed within the case, the core being sealed to the inlet opening and an outlet opening of the case such that the gas is separate from a coolant sealed within case and traveling between and around the gas tubes of the core. The outlet of the inlet diffuser then surrounds inlet ends of the gas tubes of the core. In this way, the gas travels through the heat exchanger assembly of the preferred embodiment going from the gas inlet pipe to the inlet diffuser and then to the core.

In the preferred embodiment, a joint between the outlet of the gas inlet pipe and the inlet of the inlet diffuser is arranged such that a center axis of each of these elements is substantially aligned with a center longitudinal axis of the core. Inlet diffusers may have various different shapes and configurations to accommodate various geometries of the case of such a heat exchanger assembly. The current invention improves flow distribution at the outlet of the gas inlet pipe, which helps to improve flow distribution downstream of the gas inlet pipe regardless of the configuration of the inlet diffuser. This enables the use of various inlet diffuser design by helping to ensure flow distribution to the core. In the preferred embodiment, the inlet diffuser includes diffuser walls that taper laterally outward as the inlet diffuser extends toward the case from the inlet pipe, and in this embodiment, at least of of the diffuser walls includes a diffuser wall bend between the inlet of the inlet diffuser and the outlet of the inlet differ. Using such a diffuser with a standard, prior art gas inlet pipe has tended to result in uneven flow distribution at an inlet area of the core when the gas inlet pipe has at least one bend as the gas tends to hug the bend as the gas moves within the pipe. Momentum further carries the gas in that pattern into the inlet diffuser and beyond.

In the preferred embodiment, the gas inlet pipe includes at least two intermediate bends between the at least bend and the inlet diffuser. At least four distinction sections can be defined within the gas inlet pipe in this configuration. A first tubular pipe section and a second tubular pipe section are disposed between a first, inlet end and a second, outlet end of the gas inlet pipe. A gas flow direction is defined as moving from the first end toward the second end of the gas inlet pipe. Both the first section and the second section have insides surfaces with circular cross sections, and in the preferred embodiment the inside diameters of the first section and the second section are the same. The first section extends parallel to a first axis, and the second section extends parallel to a second axis, which is perpendicular to the first axis. Between the first section and the second section in the preferred embodiment are a third tubular pipe section and a fourth tubular pipe section. The third section extends from the first section to the fourth section, and the fourth section extends from the third section to the second section.

The third section in the preferred embodiment has a third inside surface defined by a major inside dimension that is greater than the second inside diameter and a minor inside dimension that is less than the second inside diameter, and the third section extends parallel to the second axis between the first tubular section and the second tubular section. The fourth section in the preferred embodiment has a fourth inside surface that connects the third inside surface to the second circular inside surface, and at least a portion of the fourth inside surface extends parallel to third axis, which is oriented at an oblique angle to the second axis.

Also in the preferred embodiment, there are three bends between the first section and the second section. A first bend of the three bends is located between the first tubular section and the third tubular section. A second bend of the three bends is located between the third tubular section and the fourth tubular section. A third bend of the three bends is located between the fourth tubular section and the second tubular section. In the preferred embodiment, the first bend is between 75 and 120 degrees and the second bend is between 20 and 80 degrees from the second axis or an axis parallel to the second axis in the direction of the first axis. The third bend is at a supplementary angle to the second bend. In this configuration, at least a portion of the third section extends beyond the second section in a portion of flow direction that extends parallel the first axis. Further in this configuration, at least a portion of the second section extends beyond the third section in the portion of the flow direction that extends parallel to the first axis. In this way, the flow direction extends parallel to the first axis from the first section to the third section, then extends parallel to the second axis in the third section, then in the fourth section turns partially back toward the first axis along a third axis, and then from the fourth section to the second section turns back to be parallel to the second axis. This configuration interrupts the momentum of the gas to break the flow away from outside portions of walls of inlet pipe and to more evenly center the gas flow within the inlet pipe.

The four sections of the inlet pipe have similar volumes in the preferred embodiment. Different volumes between the sections may have advantages and may be applied to this design. Further, in the preferred embodiment, the first axis of the inlet pipe is at an oblique angle to a fourth transverse axis of the case. The third axis is oriented according to the angular orientation between the first axis of the inlet pipe and the fourth axis of the case. A interior edge of the inlet pipe is defined by the intersection of a top inner surface of the third section and a top inner surface of the fourth section. A angle of this edge is preferable configured according to the orientation between the first axis and the fourth axis. This angle may be perpendicular to the first axis or at another angle to the first axis in improve the flow distribution to the core or within the diffuser.

DETAILED DESCRIPTION

Before any embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
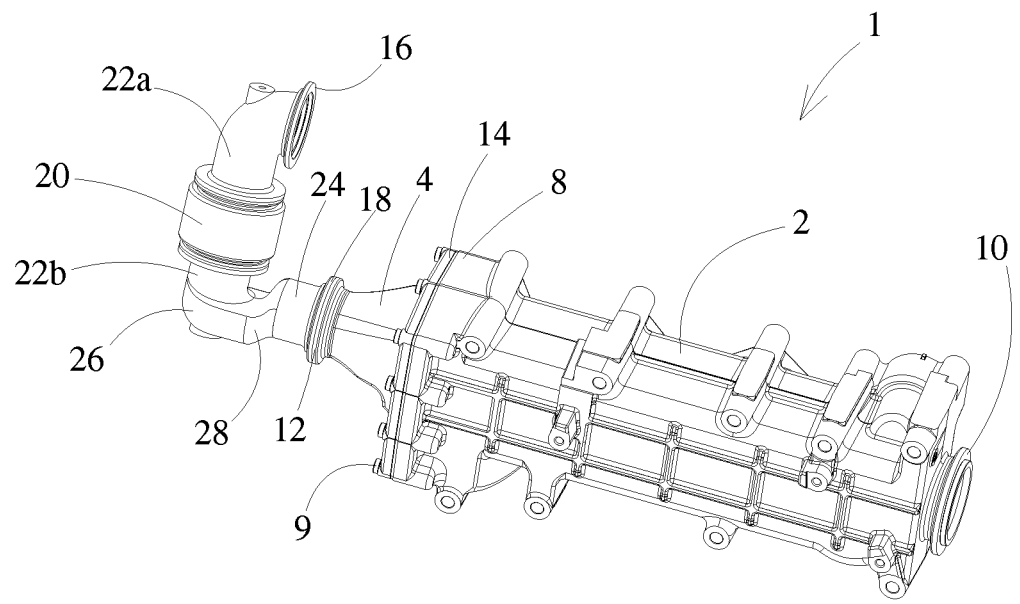
FIG. 1 is a perspective view of a heat exchanger assembly.
Figure 2:
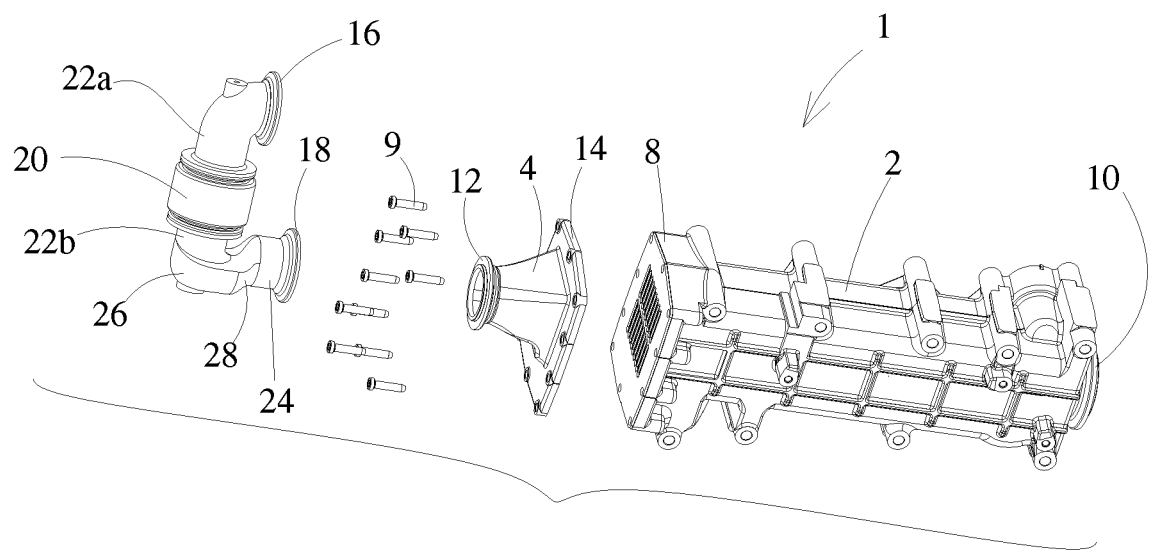
FIG. 2 is an exploded perspective view of the heat exchanger assembly of FIG. 1.

FIGS. 1 and 2 depict a heat exchanger assembly 1, which could be used as a vehicle exhaust gas cooler, charge air cooler, or another type of heat exchanger. The assembly includes a case 2 having an inlet end 8 and an outlet end 10. Gas flows into the case 2 via an inlet diffuser 4 connect to the inlet end 8 of the case 2. Fasteners 9 attach the inlet diffuser 4 to the case 2. A gas inlet pipe 6 is directed connected to the inlet diffuser 4 and connects the heat exchanger assembly 1 to other parts of the gas system or exhaust gas system for a vehicle, which is not depicted in the figures. The case 2 encloses a heat exchanger core, which is not shown. The core includes tubes that covey the gas from the inlet end 8 of the case 2 to the outlet end 10 of the case 2. The gas flow is sealed from a coolant that flows within the case 2 via at least a header plate 14 arranged at the inlet end 8 of the case 2. The coolant flows through and around the gas tubes of the core such that heat is exchanged between the gas and the coolant.

Figure 4:
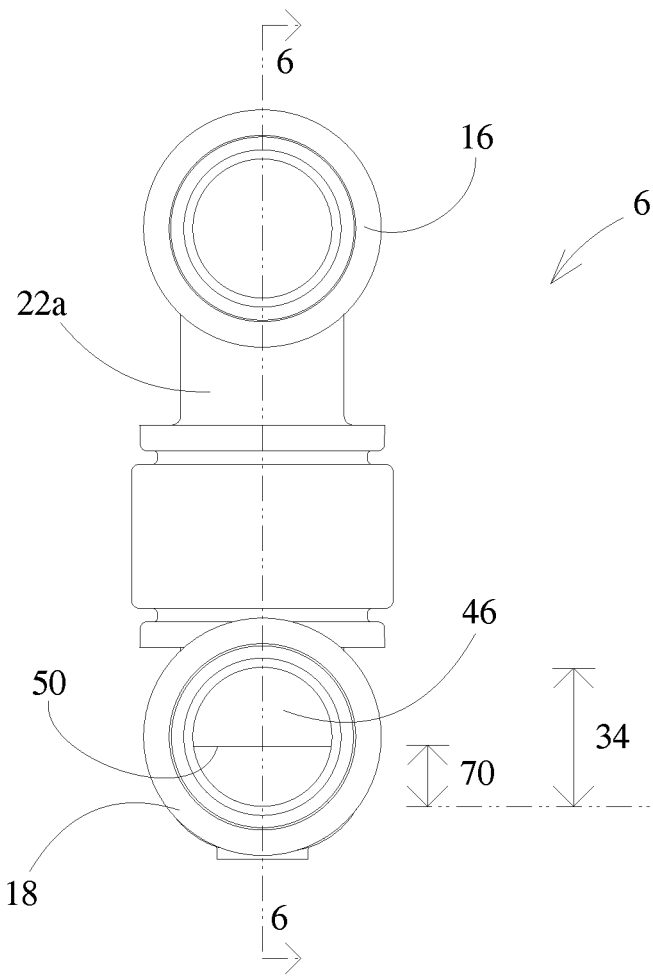
FIG. 4 is a side view of the inlet pipe of the heat exchanger assembly of FIG. 1.
Figure 5:
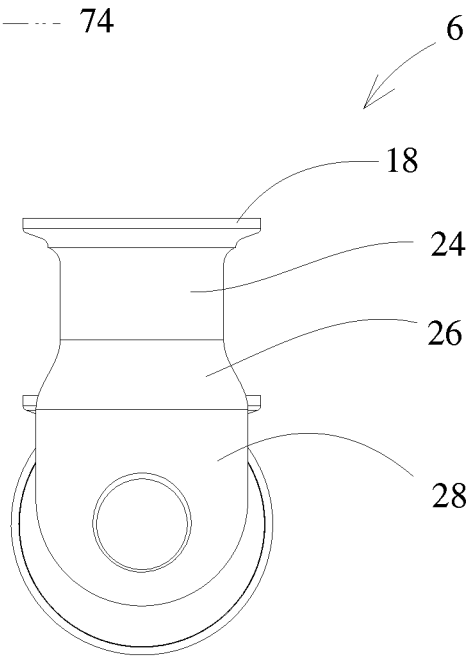
FIG. 5 is a bottom view of the inlet pipe of the heat exchanger assembly of FIG. 1.
Figure 9:
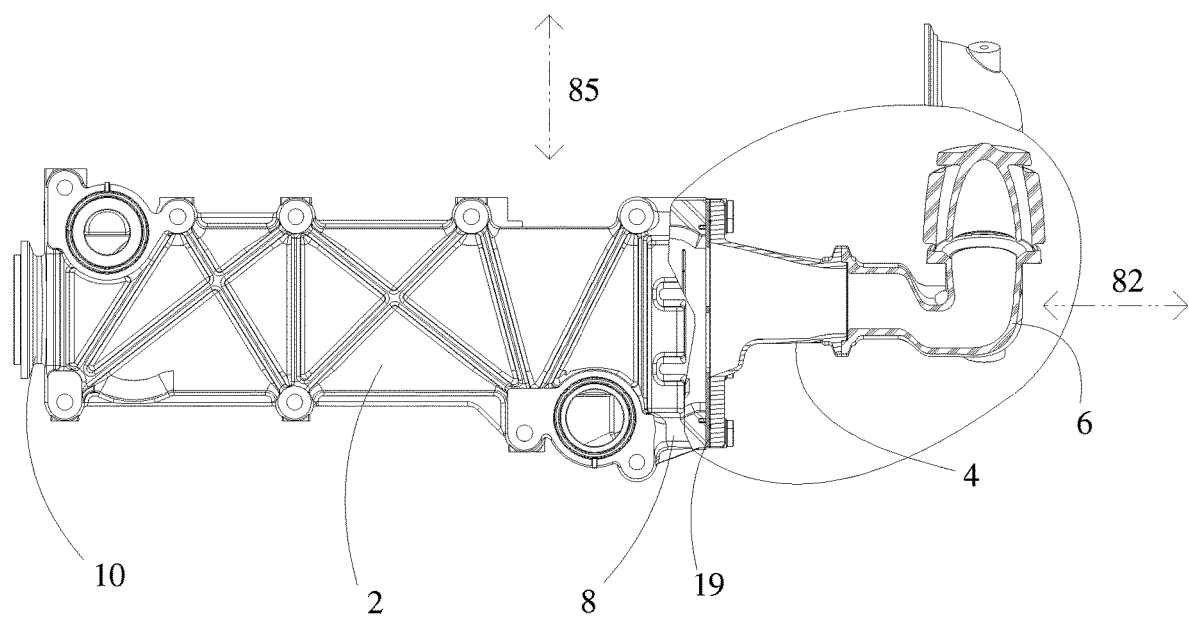
FIG. 9 is a partial sectional front view of the heat exchanger assembly of FIG. 1.

Further shown in FIGS. 1 and 2 is the arrangement of the gas inlet pipe 6 with the inlet diffuser 4. The inlet pipe 6 extends from an inlet end 16 of the inlet pipe 6 to an outlet end 18 of the inlet pipe 6, and this is also a general flow direction of the gas through the inlet pipe 6 and into the inlet diffuser 4. The outlet end 18 of the inlet pipe 6 is attached to the inlet 12 of the inlet diffuser 4, and this joint is centered around an central axis 82 of the outlet end 18 of the inlet pipe 6 and the inlet 12 of the diffuser 4. The joint between the inlet diffuser 4 and the inlet pipe 6 also defines a joint connection plain 74, as shown in FIG. 4. Additionally, this central axis 82 is in common with the longitudinal axis of the core as shown in FIG. 9. The inlet diffuser 4 has walls that taper from the inlet 12 of the diffuser 4 to the outlet 14 of the diffuser 4, such that the outlet 14 surrounds the core at the header plate 14 of the core, as best shown in FIG. 9.

FIGS. 3-8 depict the structure of the gas inlet pipe 6. The gas inlet pipe 6 is configured to conduct gas in the general flow direction from the inlet 16 to the outlet 18, between which the flow direction changes according to the structure of the inlet pipe 6 to prevent the momentum of the gas to generate uneven flow distribution at the outlet 18 and into the inlet diffuser 4. This is especially a concern when inlet pipes such as this have at least one bend before the heat exchanger or diffuser. In the preferred embodiment, the inlet pipe 6 includes a first bend 90, a second bend 92, and a third bend 94 between the inlet 16 and the outlet 18 of the inlet pipe 6. These bends define four different sections of the inlet pipe 6. A first section 22a/b of the inlet pipe includes two parts—an upper part 22a and a lower part 22b, which in this embodiment, have a bellow 20 therebetween. A second section 24 is located on the opposite side of the first bend from the first section 22a/b. A third section 26 of the inlet pipe 6 extends from the lower portion of the first section 22b to the fourth section 28, where the first bend 90 is disposed between the third section 26 and lower portion of the first section 22b. The fourth section 28 extends from the third section 26 to the second section 24, where the second bend 92 is disposed between the third section 26 and the fourth section 28 and where the third bend 94 is disposed between the fourth section 28 and the second section 24.

Figure 3:
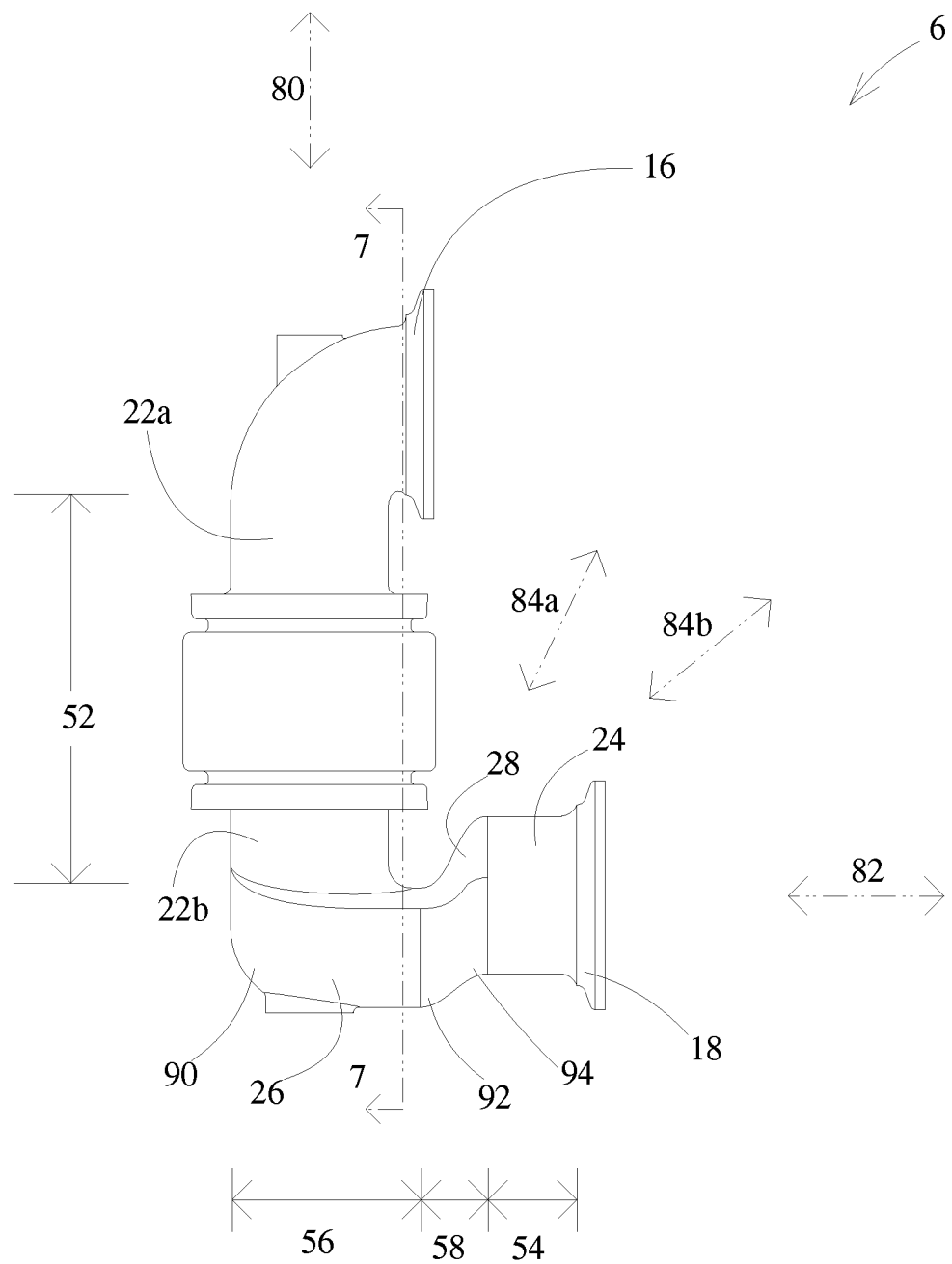
FIG. 3 is a front view of an inlet pipe of the heat exchanger assembly of FIG. 1.
Figure 6:
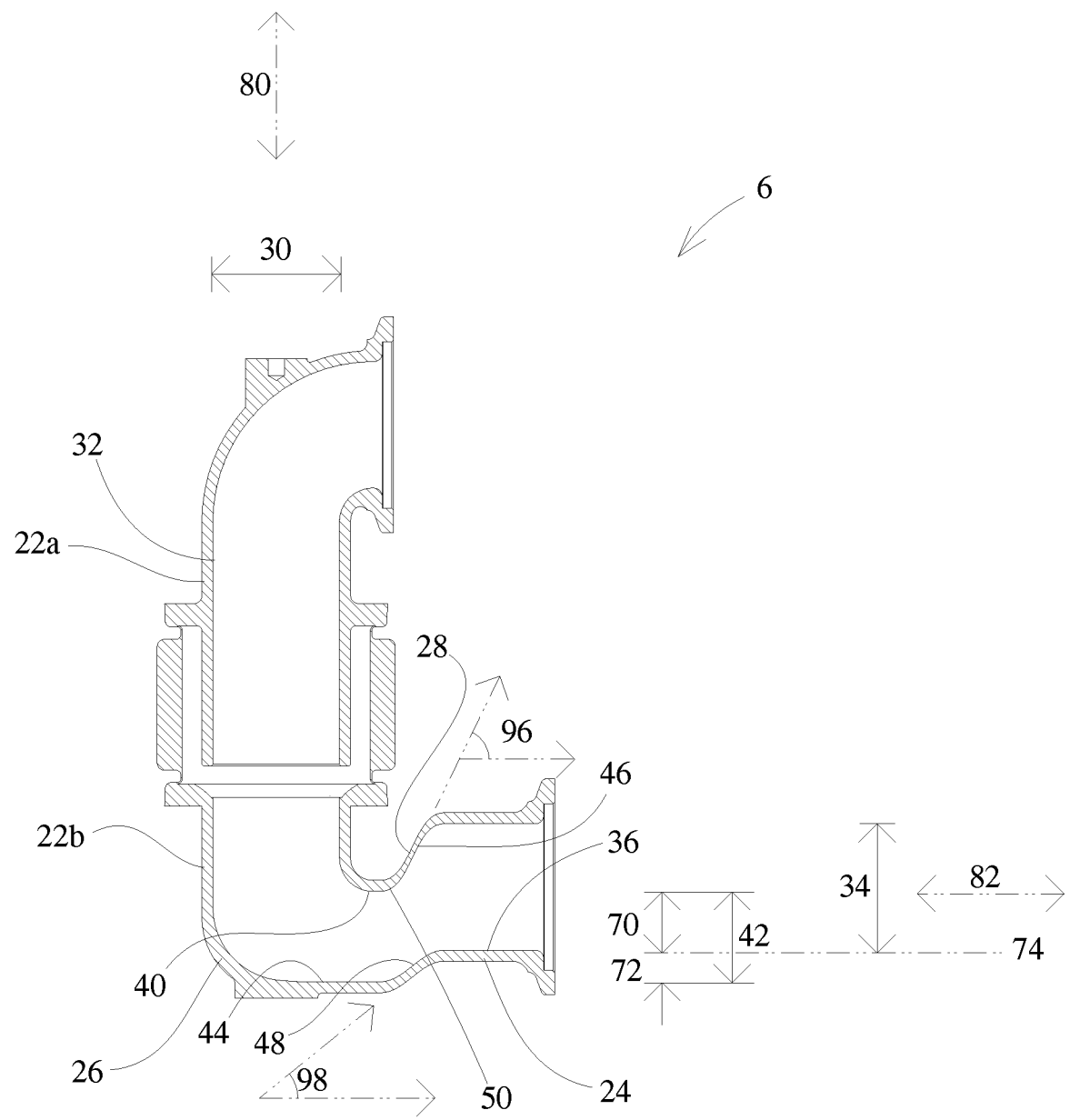
FIG. 6 is a front sectional view of the inlet pipe of the heat exchanger assembly of FIG. 1.
Figure 7:
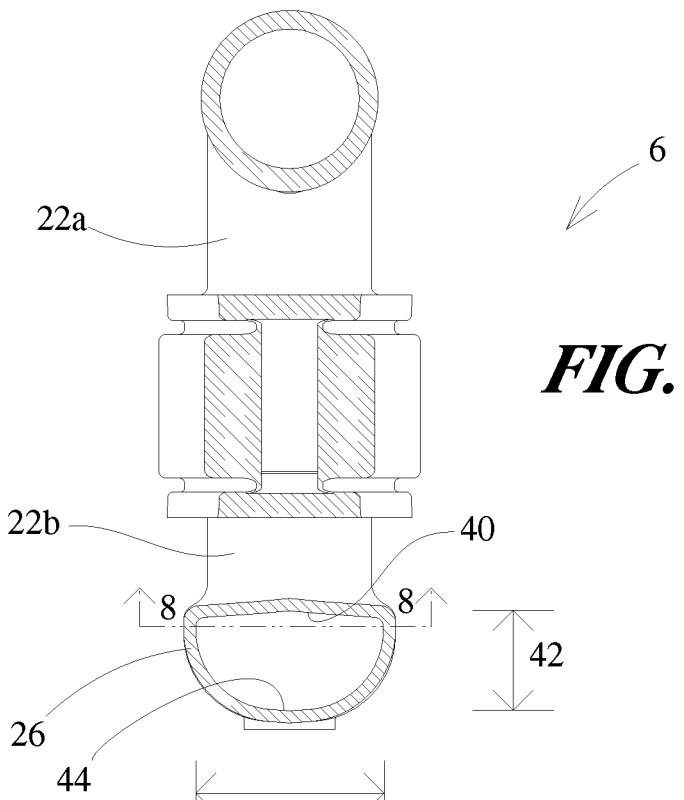
FIG. 7 is a side sectional view of the inlet pipe of the heat exchanger assembly of FIG. 1.
Figure 8:
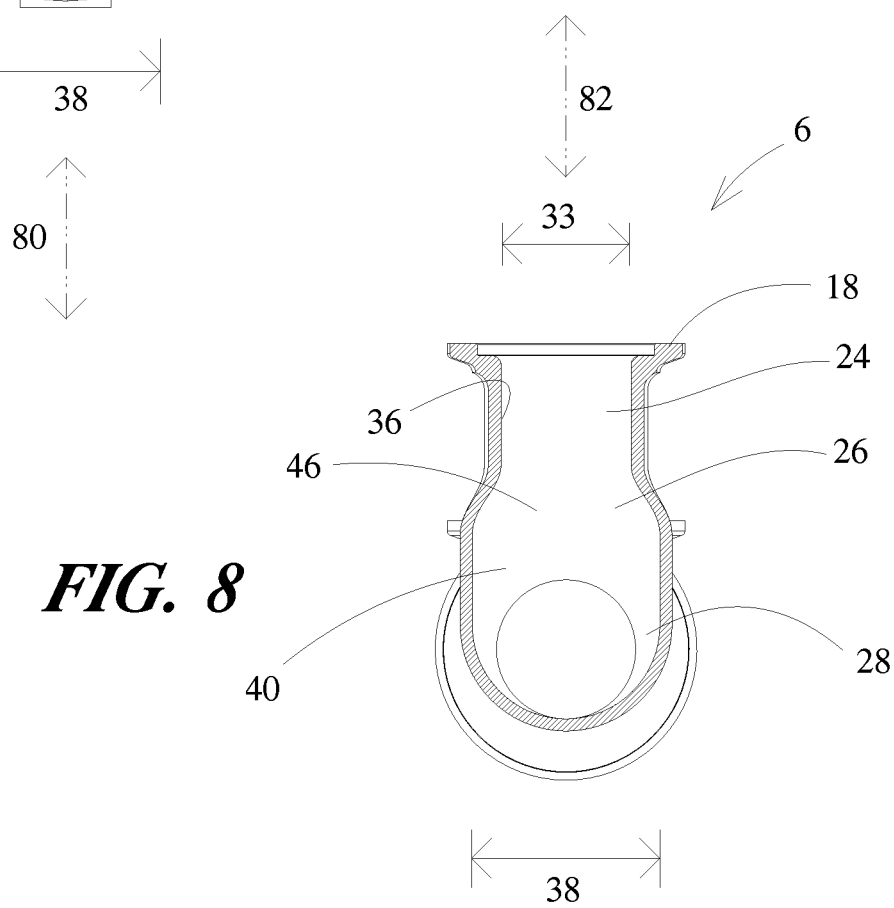
FIG. 8 is a bottom sectional view of the inlet pipe of the heat exchanger assembly of FIG. 1.

In the preferred embodiment, both the first section 22a/b and the second section 24 includes inside surfaces 32 and 36, respectively, with circular cross-sections and the same inside diameters 30 and 33, respectively, as shown in FIGS. 6 and 8. The first section 22a/b extends parallel to a first axis 80, and the second section 24 extends parallel to the second axis 82, perpendicular to the first axis 80, as shown in FIG. 3. The third section 26 is defined by inner surfaces including a top inner surface 40 and a bottom inner surface 44 and by a major inside diameter 38 and a minor inside diameter 42, as shown in FIG. 7. In this embodiment, the major inside diameter 38 is greater than the inside diameter 33 of the second section 24, and the minor insider diameter 42 is less than the inside diameter 33 of the second section 24, as shown in FIG. 8. The third section 26 extends in the flow direction parallel to the second axis 82. The fourth section 28 extends in the flow direction and parallel to at least one of a third axis 84a and a fourth axis 84b, where the third axis and the fourth axis are each oriented at an oblique angle to the second axis 82, as shown in FIG. 3. The fourth section 28 includes a top inner surface 46 that extends at an first angle 96 to the second axis 82 or a direction parallel to the second axis 82 and a bottom inner surface 48 that extends at a second angle 98 to the second axis 82 or a direction parallel to the second axis 82, as depicted FIG. 6. The first angle 96 is between 40 and 70 degrees from the second axis 82 in the direction of the first axis 80. The second angle 98 is between 20 and 50 degrees from the second axis 82 in the direction of the first axis 80.

Per FIG. 3, the first section 22a/b of this embodiment extends a first length 52 parallel to the first axis 80. The second section 24 extends a second length 54 parallel to the second axis 82. The third section 26 extends a third length 56 parallel to the second axis 82, and the fourth section 28 extends a fourth length 58 parallel to the second axis 82. The third length 56 is greater then the insider diameter 33 of the second section 24. As shown in FIGS. 4 and 6, the inlet pipe 6 includes an interior edge 50 where the top inner surface 40 intersects with the top inner surface 46 of the fourth section 28. A height of the interior edge 50 parallel to the first axis 80 and toward the inlet end 16 from the joint connection plane 74 is less than a height 34 of the inner surface 36 of the second section 24 in the same direction as shown in FIG. 6. The minor inside diameter 42 extends across the joint connection plane 74. A height 72 of the bottom inner surface 44 of the third section 26 extends parallel to the first axis 80 to the opposite side of the joint connection plane 74 from the interior edge 50. In this configuration, at least a portion of the third section 26 extends beyond the second section 24 in a portion of flow direction that extends parallel the first axis 80. Further in this configuration, at least a portion of the second section 24 extends beyond the third section 26 in the portion of the flow direction that extends parallel to the first axis 80. In this way, the flow direction extends parallel to the first axis 80 from the first section to the third section, then extends parallel to the second axis 82 in the third section 26, then in the fourth section 28 turns partially back toward the first axis 80 along a third axis 84a or a fourth axis 84b, and then from the fourth section 28 to the second section 24 turns back to be parallel to the second axis 82, as shown in FIGS. 3 and 6.

In the preferred embodiment, the interior edge 50 lies in a plane parallel to the second axis 82. In other embodiments, the interior edge 50 may be oriented at an oblique angle to the second axis 82. Also, in the current embodiment, the first axis 80 is not parallel to a fifth axis 85 that is perpendicular to the second axis 82 and parallel to a lateral direction of the case 2.

Various alternatives to the certain features and elements of the present invention are described with reference to specific embodiments of the present invention. With the exception of features, elements, and manners of operation that are mutually exclusive of or are inconsistent with each embodiment described above, it should be noted that the alternative features, elements, and manners of operation described with reference to one particular embodiment are applicable to the other embodiments.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention.

What is claimed is:

1. An inlet pipe for a heat exchanger comprising:
   a first end and a second end, wherein a fluid flow direction within the inlet pipe is defined as being from the first end to the second end;
   a first bend located between the first end and the second end;
   a second bend located between the first bend and the second end;
   a third bend located between the second bend and the second end;
   a first tubular section having a first circular inside surface defined by a first inside diameter, wherein the first tubular section extends parallel to a first axis;
   a second tubular section having a second circular inside surface defined by a second inside diameter, wherein the second tubular section extends parallel to a second axis;
   a third tubular section having a third inside surface defined by a major inside dimension that is greater than the second inside diameter and a minor inside dimension that is less than the second inside diameter, wherein the third tubular section extends parallel to the second axis between the first tubular section and the second tubular section; and
   a fourth tubular section having a fourth inside surface that connects the third inside surface to the second circular inside surface, wherein at least a portion of the fourth inside surface extends parallel to a third axis;
   wherein the first tubular section and the second tubular section are between the first end and the second end,
   wherein the third axis is oriented at an oblique angle to the second axis,
   wherein the first bend is located between the first tubular section and the third tubular section,
   wherein the second bend is located between the third tubular section and the fourth tubular section, and
   wherein the third bend is located between the fourth tubular section and the second tubular section.

2. The inlet pipe of claim 1, wherein the first inside diameter and the second inside diameter are the same.

3. The inlet pipe of claim 1, wherein the first bend is a ninety degree angle.

4. The inlet pipe of claim 1, wherein the third axis is at an obtuse angle to the second axis.

5. The inlet pipe of claim 1, wherein the second bend is at an obtuse angle to the second axis.

6. The inlet pipe of claim 1, wherein the first axis is perpendicular to the second axis.

7. The inlet pipe of claim 1, wherein an intersection between the third inside surface and the fourth inside surface defines a first straight edge, and wherein the first straight edge is located within a first height of the inlet pipe, the first height defined by the second diameter measured parallel to the first axis along a height of the inlet pipe parallel to the first axis.

8. The inlet pipe of claim 7, wherein the first straight edge is located within a first plane perpendicular to the first axis.

9. The inlet pipe of claim 7, wherein the first straight edge is located within a second plane non-perpendicular to the first axis.

10. The inlet pipe of claim 1, wherein the third inside surface includes a first planar surface.

11. The inlet pipe of claim 10, wherein the first planar surface is located within a first plane perpendicular to the first axis.

12. The inlet pipe of claim 10, wherein the first planar surface is located within a second plane non-perpendicular to the first axis.

13. The inlet pipe of claim 10, wherein the fourth inside surface includes a second planar surface, and wherein the first planar surface is directly attached to the second planar surface.

14. The inlet pipe of claim 1, wherein the fourth inside surface includes a lower surface and an upper surface opposite of the lower surface, wherein a first angle is defined between the lower surface and the second axis, wherein a second angle is defined between the upper surface and the second axis, and wherein the first angle and the second angle are different.

15. The inlet pipe of claim 14, wherein the first angle is between 20 degrees and 50 degrees and wherein the second angle is between 40 degrees to 70 degrees.

16. An exhaust gas heat exchanger comprising:
a case having an inlet opening, an outlet opening; a coolant inlet port, and a coolant outlet port;
a core including two header plates on opposite sides of the core and a plurality of gas conduits that extend between and are fluidly sealed to the header plates, wherein the core is located within the case, wherein one of the header plates is located at and fluidly sealed to the inlet opening and the other of the header plates is located at and fluidly sealed to the outlet opening, and wherein coolant flow areas are defined within the case on the outside of the gas conduits;
a inlet diffuser including an gas inlet port and a diffuser outlet structurally connected to the inlet opening and fluidly connected to the plurality of gas conduits;
a gas pipe including, a first end and a second end;
a first bend located between the first end and the second end;
a second bend located between the first bend and the second end;
a third bend located between the second bend and the second end;
a first tubular section extending parallel to a first axis and having a first circular inside surface extending parallel to the first axis and defined by a first inside diameter;
a second tubular section extending parallel to a second axis and having a second circular inside surface extending parallel to the second axis and defined by a second inside diameter;
a third tubular section extending parallel to the second axis between the first tubular section and the second tubular section and having a third inside surface defined by a major inside dimension that is greater than the second inside diameter and a minor dimension that is less than the second inside diameter; and
a fourth tubular section extending parallel to a third axis between the second tubular section and the third tubular section and including a fourth inside surface that extends from the third inside surface to the second circular inside surface,
wherein the first tubular section and the second tubular section are between the first end and the second end,
wherein the third axis is oriented at an oblique angle to the second axis, and
wherein the second end of the gas inlet pipe is directly attached to the gas inlet port of the inlet diffuser.

* * * * *